(12) United States Patent
Choi et al.

(10) Patent No.: US 8,018,829 B2
(45) Date of Patent: Sep. 13, 2011

(54) METHOD AND APPARATUS FOR OFDM BASED ON 3D SIGNAL CONSTELLATION

(75) Inventors: Eun Chang Choi, Daejeon (KR); Jae Doo Huh, Daejeon (KR); Seon Geun Kang, Jinju (KR)

(73) Assignees: Electronics and Telecommunications Research Institute, Daejeon (KR); Industry & Academic Cooperation Foundation Gyeongsang National University, Gyeongsangnam-do (KR)

( * ) Notice: Subject to any disclaimer, the term of this patent is extended or adjusted under 35 U.S.C. 154(b) by 96 days.

(21) Appl. No.: 12/505,013

(22) Filed: Jul. 17, 2009

(65) Prior Publication Data

US 2010/0020675 A1 Jan. 28, 2010

(30) Foreign Application Priority Data

Jul. 25, 2008 (KR) ........................ 10-2008-0072938

(51) Int. Cl.
*H04J 9/00* (2006.01)
(52) U.S. Cl. ........................ 370/203; 370/480; 375/222
(58) Field of Classification Search ........................ None
See application file for complete search history.

(56) References Cited

U.S. PATENT DOCUMENTS

| 6,115,415 | A | * | 9/2000 | Goldstein et al. | ............. | 375/222 |
| 2005/0123061 | A1 | * | 6/2005 | Smith et al. | ................... | 375/261 |
| 2008/0170636 | A1 | | 7/2008 | Han | | |

FOREIGN PATENT DOCUMENTS

| EP | 1 694 021 | 8/2006 |
| EP | 1 713 225 | 10/2006 |
| KR | 1996-0003193 | 1/1996 |
| KR | 10-2006-0029236 | 4/2006 |

OTHER PUBLICATIONS

Seog Geun Kang, "An OFDM with 3-D Signal Mapper and 2-D IDFT Modulator", Dec. 2008, IEEE Communications Letters, vol. 12, No. 12, pp. 871-873.*
Korean Notice of Allowance issued May 18, 2010 in corresponding Korean Patent Application 10-2008-0072938.

* cited by examiner

*Primary Examiner* — Kevin C Harper
(74) *Attorney, Agent, or Firm* — Staas & Halsey LLP

(57) ABSTRACT

Provided is an orthogonal frequency division multiplexing (OFDM) apparatus using a 3-dimensional (3D) signal constellation. The apparatus performs 2D inverse fast Fourier transform on a set of 3D subchannel signals that is mapped by a signal constellation including signal points distributed on the surface of a 3D sphere.

9 Claims, 5 Drawing Sheets

FIG. 4A

| NUMBER OF SIGNALING POINTS=4 | | | |
|---|---|---|---|
| SYMBOL OF SIGNALING POINTS | VALUE OF X-AXIS COORDINATE | VALUE OF Y-AXIS COORDINATE | VALUE OF Z-AXIS COORDINATE |
| $S_0$ | 0 | 0 | 1 |
| $S_1$ | $-\sqrt{2}/3$ | $-\sqrt{6}/3$ | $-1/3$ |
| $S_2$ | $2\sqrt{2}/3$ | 0 | $-1/3$ |
| $S_3$ | $-\sqrt{2}/3$ | $\sqrt{6}/3$ | $-1/3$ |

FIG. 4B

| NUMBER OF SIGNALING POINTS=8 | | | |
|---|---|---|---|
| SYMBOL OF SIGNALING POINTS | VALUE OF X-AXIS COORDINATE | VALUE OF Y-AXIS COORDINATE | VALUE OF Z-AXIS COORDINATE |
| $S_0$ | $\sqrt{3}/3$ | $-\sqrt{3}/3$ | $\sqrt{3}/3$ |
| $S_1$ | $\sqrt{3}/3$ | $\sqrt{3}/3$ | $\sqrt{3}/3$ |
| $S_2$ | $-\sqrt{3}/3$ | $\sqrt{3}/3$ | $\sqrt{3}/3$ |
| $S_3$ | $-\sqrt{3}/3$ | $-\sqrt{3}/3$ | $\sqrt{3}/3$ |
| $S_4$ | $\sqrt{3}/3$ | $-\sqrt{3}/3$ | $-\sqrt{3}/3$ |
| $S_5$ | $\sqrt{3}/3$ | $\sqrt{3}/3$ | $-\sqrt{3}/3$ |
| $S_6$ | $-\sqrt{3}/3$ | $\sqrt{3}/3$ | $-\sqrt{3}/3$ |
| $S_7$ | $-\sqrt{3}/3$ | $-\sqrt{3}/3$ | $-\sqrt{3}/3$ |

METHOD AND APPARATUS FOR OFDM BASED ON 3D SIGNAL CONSTELLATION

CROSS-REFERENCE TO RELATED PATENT APPLICATION

This application claims the benefit of Korean Patent Application No. 10-2008-0072938, filed on Jul. 25, 2008, in the Korean Intellectual Property Office, the disclosure of which is incorporated herein in its entirety by reference.

BACKGROUND OF THE INVENTION

1. Field of the Invention

The present invention relates to an orthogonal frequency division multiplexing (OFDM) method based on 3-dimensional (3D) signal constellation.

2. Description of the Related Art

In wireless communication technology fields, 2-dimensional (2D) signal constellation is used as a signal mapper in an orthogonal frequency division multiplexing (OFDM) apparatus. A conventional OFDM apparatus of this kind using a 2D signal constellation as a signal mapper is widely used in both wireless communication apparatuses and mobile communication apparatuses, but the structure of the conventional OFDM apparatus has hardly been changed after its design in the early 1980's.

Especially in 1990s, OFDM apparatuses were recommended for and adopted as the technical standard for European digital broadcasting and IEEE 802.11 wireless local area networks (WLANS). Accordingly, a conventional structure of OFDM apparatuses is invulnerable.

SUMMARY OF THE INVENTION

The present invention provides an orthogonal frequency division multiplexing (OFDM) apparatus, which uses a 3D signal constellation as a signal mapper and uses a 2D inverse fast Fourier transform to modulate the 3D signal.

According to an aspect of the present invention, there is provided an orthogonal frequency division multiplexing (OFDM) apparatus including: a signal mapper which maps parallelized low-rate bit streams to the corresponding signal points of a 3-dimensional (3D) signal constellation, and generates N 3D subchannel signals of an OFDM symbol in the frequency domain; a converter which generates a 2D matrix from the N mapped 3D coordinates; and an inverse fast Fourier transform unit which performs 2D inverse fast Fourier transform on the N 3D subchannel signals that have been generated by the signal mapper.

According to another aspect of the present invention, |there|[κ1] is provided an OFDM method including: parallelizing a block of binary input sequence to N low-rate bit streams; mapping the N low-rate bit streams to N 3D subchannel signals using a signal constellation comprising signal points distributed on the surface of a 3D sphere; generating a 2D matrix based on the N 3D subchannel signals; and performing 2D inverse fast Fourier transform to modulte data in the 2D matrix of N 3D signals.

BRIEF DESCRIPTION OF THE DRAWINGS

Features including the above and advantages of the present invention will become more apparent by describing in detail exemplary embodiments thereof with reference to the attached drawings in which:

FIGS. 4A and 4B are tables showing 3D coordinates of the signal points used in FIGS. 3A and 3B respectively.

DETAILED DESCRIPTION OF THE INVENTION

Figure 1:
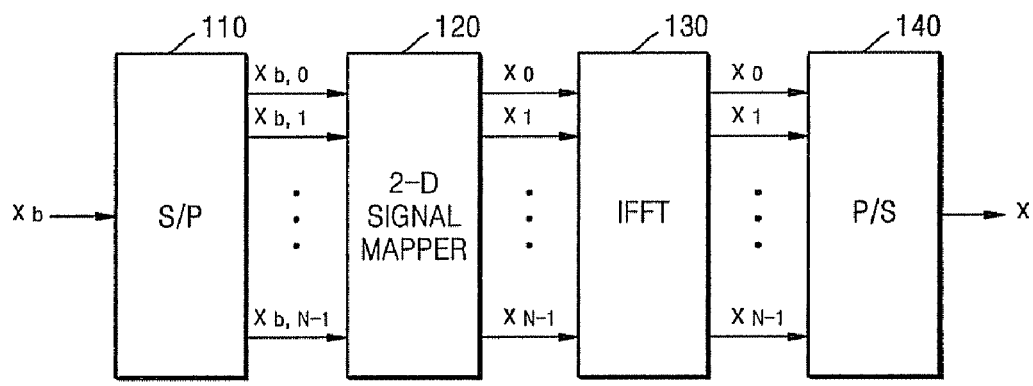
FIG. 1 is a block diagram illustrating a conventional orthogonal frequency division multiplexing (OFDM) apparatus using a 2-dimensional (2D) signal constellation as a signal mapper.

The present invention will now be described hereafter completely with reference to the accompanying drawings, in which exemplary embodiments of the invention are shown. In the drawings, like reference numerals denote like |elements| [κ2]. While describing the present invention, detailed descriptions about either related well-known functions or configurations that may diminish the clarity of the present invention are omitted.

FIG. 1 is a block diagram illustrating an orthogonal frequency division multiplexing (OFDM) apparatus using a 2-dimensional (2D) signal constellation as a signal mapper.

As illustrated in FIG. 1, a general OFDM apparatus includes a serial-to-parallel converter 110, a 2D signal mapper 120 implemented with a 2D signal constellation, an inverse fast Fourier transform unit 130, and a parallel-to-serial converter 140.

A serial binary input sequence, which is parallelized in the serial-to-parallel converter 110, is mapped to a set of N complex numbers corresponding to signal points of the 2D signal constellation at the 2D signal mapper 120, and then is modulated by the inverse fast Fourier transform unit 130 as shown in Equation 1. The N modulated complex numbers are arranged in series at the parallel-to-serial converter 140.

$$x_n = \frac{1}{N}\sum_{k=0}^{N-1} X_k \exp(j2\pi nk/N), \ 0 \le n \le N-1 \quad (1)$$

In Equation 1, $0 < n < N-1$, N denotes the number of subchannels used in the OFDM apparatus, and the index k denotes each subchannel.

Figure 2:
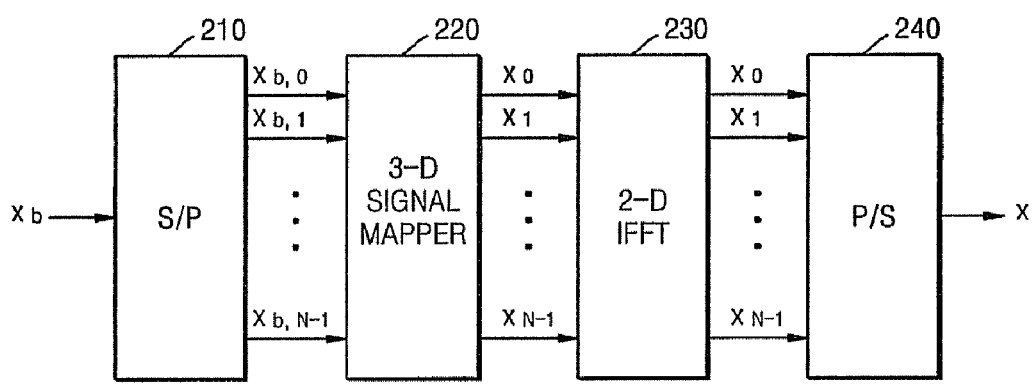
FIG. 2 is a block diagram illustrating an OFDM apparatus according to an embodiment of the present invention.

FIG. 2 is a block diagram of an OFDM apparatus according to an embodiment of the present invention.

Referring to FIG. 2, the OFDM apparatus includes a serial-to-parallel converter 210, a 3D signal mapper 220 implemented with a 3D signal constellation, a 2D inverse fast Fourier transform unit 230, and a parallel-to-serial converter 240.

The OFDM apparatus according to the current embodiment of the present invention employs a signal mapper of 3D constellation to map a parallelized low-rate bit stream to a 3D signal point distributed on the surface of a 3D sphere. In order to modulate a set of 3D signals, the 2D inverse fast Fourier transform unit 230 is employed.

Operations of the OFDM apparatus will now be described.

The serial-to-parallel converter 210 parallelizes a serial input binary sequence $X_b$ to generate N low-rate bit streams of $X_{b,0}, X_{b,1}, \ldots X_{b,N-1}$, which are assigned to N subchannels. Each low rate bit stream is converted to a signal point of the 3D signal constellation used at the 3D signal mapper 220.

The signal constellations consisting fo 4 and 8 signal points in the 3D coordinate system will be described later with reference to FIGS. 3A and 3B, and 4A and 4B.

The set of N subchannel signals can be represented as a 2D matrix form given in Equation 2. The set of N subchannel signals is unable to be modulated by a conventional inverse fast Fourier transform unit 130 shown in FIG. 1. Accordingly, the OFDM apparatus of the present invention employs the 2D inverse fast Fourier transform unit 230 to modulate the 3D subchannel signals.

$$S(k_1, k_2) = \begin{pmatrix} x_0 & x_1 & \ldots & x_{N-1} \\ y_0 & y_1 & \ldots & y_{N-1} \\ z_0 & z_1 & \ldots & z_{N-1} \end{pmatrix} \quad (2)$$

In Equation 2, each column corresponds one location of a subchannel signal in the 3D coordinate system. For example, feasible values of signal point of x-axis, y-axis, and z-axis in the 3D coordinate system are illustrated in FIGS. 4A and 4B when the numbers of signal points is 4 and 8 respectively.

$k_1$ and $k_2$ are used during inverse 2D fast Fourier transform performed by the inverse 2D fast Fourier transform unit 230 as shown in Equation 3.

$$s(n_1, n_2) = \frac{1}{N_1 N_2} \sum_{k_2=0}^{N_2-1} \sum_{k_1=0}^{N_1-1} S(k_1, k_2) \exp\left[j2\pi\left(\frac{n_2 k_2}{N_2} + \frac{n_1 k_1}{N_1}\right)\right] \quad (3)$$

$$= \frac{1}{N_1 N_2} \sum_{k_2=0}^{N_2-1} \exp(j2\pi n_2 k_2 / N_2)$$

$$\left[\sum_{k_1=0}^{N_1-1} S(k_1, k_2) \exp(j2\pi n_1 k_1 / N_1)\right]$$

In Equation 3, N1 and N2 correspond to the numbers of rows and columns of the 2D matrix shown in Equation 2, respectively.

The N 3D subchannel signals expressed in the above 2D matrix at the 2D inverse fast Fourier transform unit 230 are simultaneously modulated by using Equation 3, and then the resultant data are fed to the parallel-to-serial converter 240.

Figure 3A:
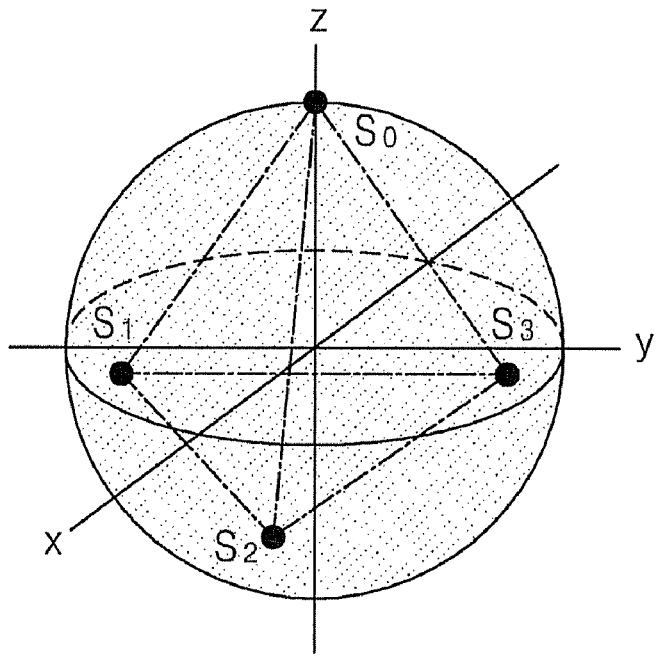
FIGS. 3A and 3B are diagrams illustrating 3D signal constellations used in an OFDM apparatus, when the numbers of signal points are 4 and 8 respectively.
Figure 3B:
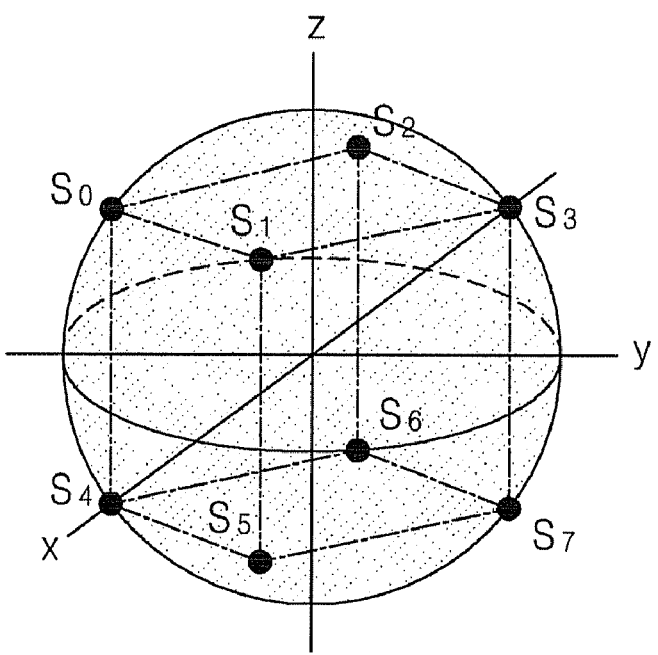

FIGS. 3A and 3B are diagrams illustrating 3D signal constellations used in the OFDM apparatus of the present invention, when the numbers of signal points are 4 and 8 respectively.

FIGS. 4A and 4B are tables representing values of signal points in the 3D coordinates used in FIGS. 3A and 3B respectively.

Figure 5A:
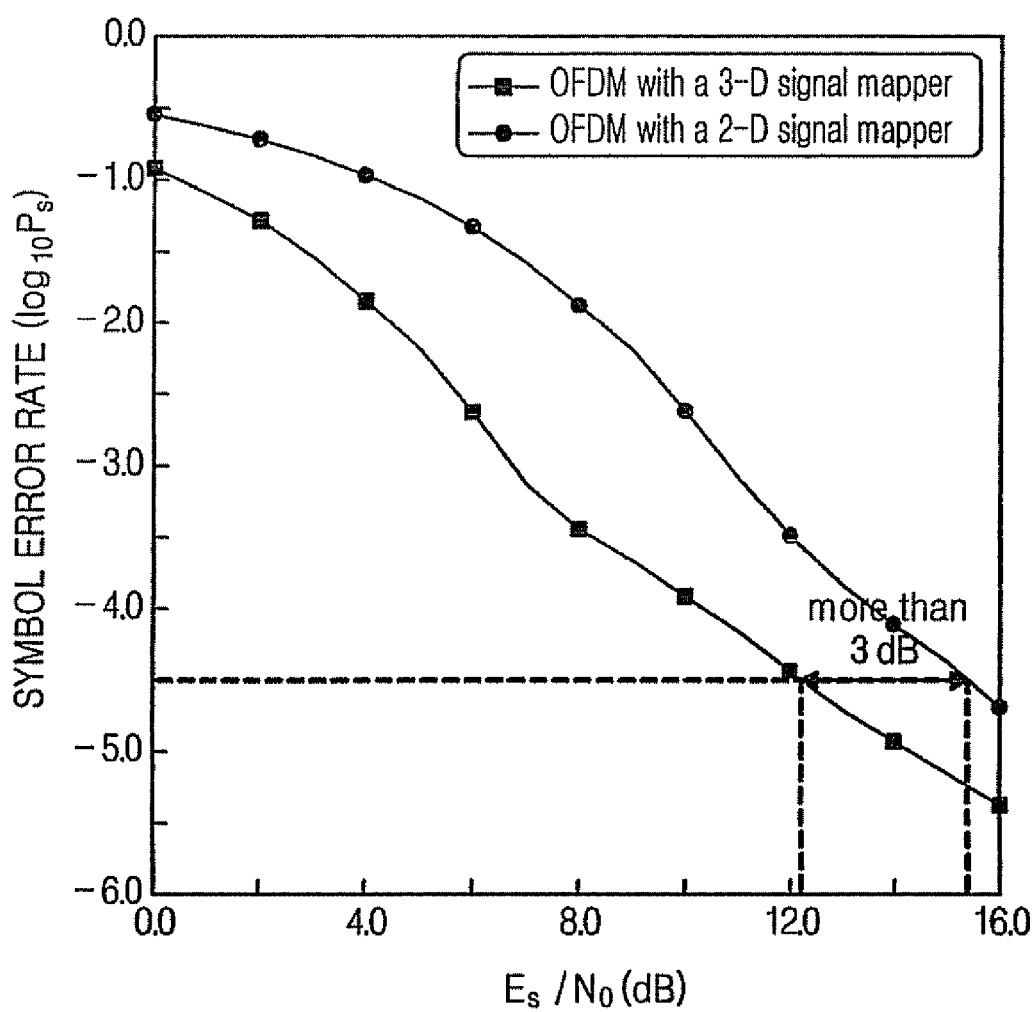
FIGS. 5A and 5B are graphs comparing symbol error rates of the OFDM apparatus using 3D signal constellations as shown in FIG. 2, with those of the conventional OFDM apparatus as shown in FIG. 1.
Figure 5B:
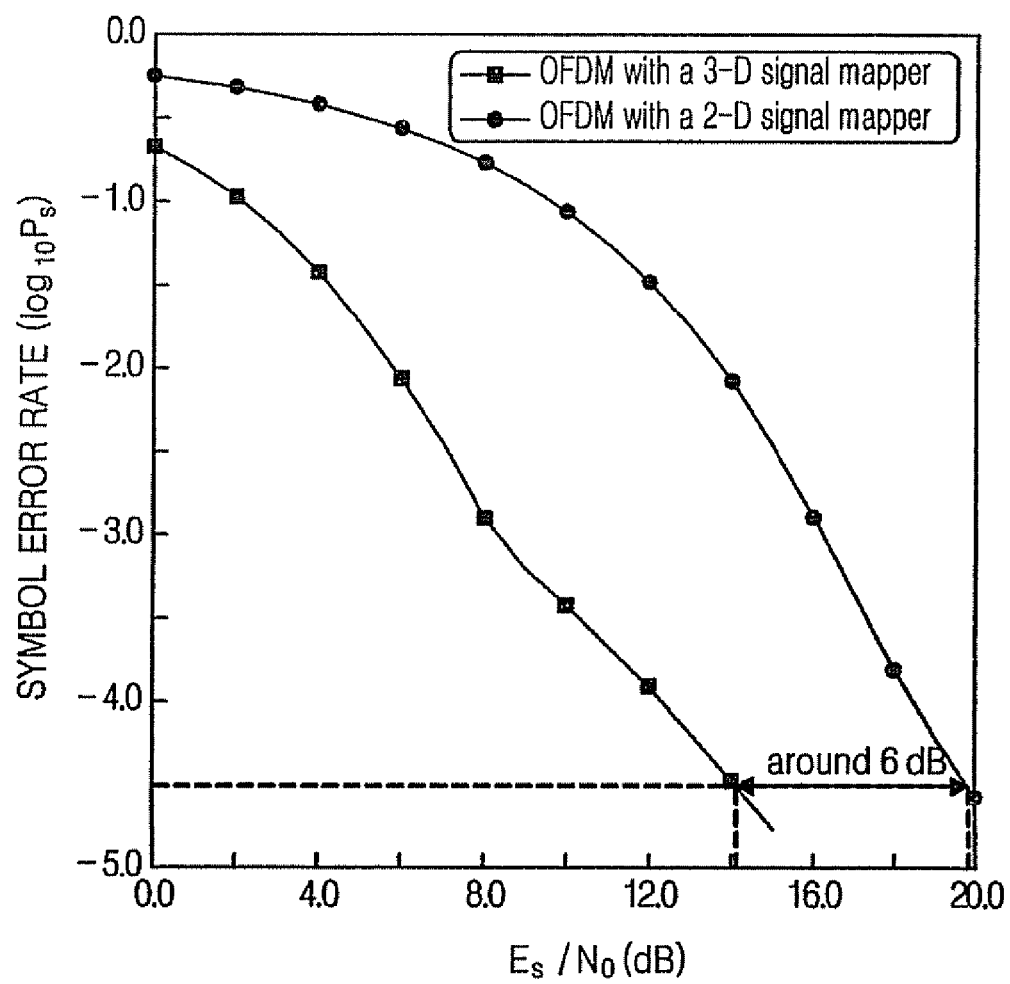

FIGS. 5A and 5B are graphs comparing symbol error rates (SER) of the OFDM apparatus using 3D signal constellations as shown in FIGS. 3A and 3B with those of a conventional OFDM apparatus, respectively.

FIG. 5A is an SER curve corresponding to the case of FIG. 3A, where the number of signal points is 4. In FIG. 5A, a signal-to-noise power ratio $E_s/N_0$ to achieve the symbol error rate of $Ps=10^{-4.5}$ (when expressed in a logarithmic scale, −4.5) is 15.3 dB in a conventional OFDM apparatus like FIG. 1, while it is 12.2 dB in the OFDM apparatus of the present invention. Thus transmission power can be reduced by approximately 3 dB in a transmitter of the present invention.

FIG. 5B is a graph corresponding to the case of FIG. 3B, where the number of signal points is 8. In FIG. 5B, a signal-to-noise power ratio $E_s/N_0$ to achieve the symbol error rate of $Ps=10^{-4.5}$ is 19.9 dB in a conventional OFDM apparatus, while it is 13.1 dB in the OFDM apparatus of the present invention. Hence, transmission power is reduced by approximately 6 dB in a transmitter of the present invention.

According to the description about the present invention, an OFDM apparatus which employs a 3D signal constellation as a signal mapper exhibits much better performance in terms of signal-to-noise power ratio as compared with a conventional OFDM apparatus using a 2D signal constellation as a signal mapper.

In addition, the OFDM apparatus of the present invention has a remarkably reduced transmission power at the same reference symbol error rate as compared with a conventional OFDM apparatus.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, USB memories, magnetic tapes, and floppy disks, optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those who have ordinary skills in the art that various changes in forms and details may be made therein without departing from the spirit and scope of the present invention as defined by the following claims.

What is claimed is:

1. An orthogonal frequency division multiplexing (OFDM) apparatus comprising:
 a signal mapper which maps parallelized low-rate bit streams to the corresponding signal points of a 3-dimensional (3D) signal constellation, and generates N 3D subchannel signals of an OFDM symbol in the frequency domain;
 a converter which generates a 2D matrix from the N mapped 3D coordinates; and
 an inverse fast Fourier transform unit which performs 2D inverse fast Fourier transform on the N 3D subchannel signals that have been generated by the signal mapper.

2. The OFDM apparatus of claim 1, further comprising:
 a serial-to-parallel converter in front of the 3D signal mapper, which generates N low-rate bit stream from a block of binary in sequence; and
 a parallel-to-serial converter, which converts a N 3D modulated data of 2D inverse fast Fourier transform unit to a serial data sequence.

3. The OFDM apparatus of claim 1, wherein each column of the 2D matrix comprises values of an x-axis, an y-axis, and a z-axis in a 3D coordinate system.

4. The OFDM apparatus of claim 1, wherein the values in rows and columns of the 2D matrix are used for the 2D inverse fast Fourier transform.

5. The OFDM apparatus of claim 1, wherein each axial component of a 3D signal is changed to a complex number.

6. An orthogonal frequency division multiplexing (OFDM) method for an OFDM apparatus comprising:
 parallelizing a block of binary input sequence to N low-rate bit streams;

mapping the N low-rate bit stream to N 3D subchannel signals using a signal constellation comprising signal points distributed on the surface of a 3D sphere;
generating a 2D matrix based on the N 3D subchannel signals; and
performing 2D inverse fast Fourier transform to modulate data in the 2D matrix of N 3D signals.

7. The OFDM method of claim 6, further comprising converting a set of 2D inverse fast Fourier transformed data in series.

8. The OFDM method of claim 6, wherein each column of the 2D matrix comprises values of an x-axis, an y-axis, and a z-axis in a 3D coordinate system.

9. The OFDM method of claim 6, wherein the values in rows and columns of the 2D matrix are used for the 2D inverse fast Fourier transform.

* * * * *